United States Patent [19]

Agarwala

[11] Patent Number: 4,892,863

[45] Date of Patent: Jan. 9, 1990

[54] ELECTRIC MACHINERY EMPLOYING A SUPERCONDUCTOR ELEMENT

[75] Inventor: Ashok K. Agarwala, Penfield, N.Y.

[73] Assignee: Eastman Kodak Company, Rochester, N.Y.

[21] Appl. No.: 251,621

[22] Filed: Sep. 30, 1988

[51] Int. Cl.$^4$ .............................................. H02K 9/00
[52] U.S. Cl. .......................................... 505/1; 310/52; 310/90.5
[58] Field of Search ................... 310/90.5, 40 R, 268, 310/10, 52, 68 R, 68 B, 156, 254; 505/700, 702, 706, 711, 775; 335/216; 336/DIG. 1

[56] References Cited

U.S. PATENT DOCUMENTS

| | | | |
|---|---|---|---|
| 3,026,151 | 3/1962 | Buchold | 310/90.5 |
| 3,175,405 | 3/1965 | Doyle | 310/90.5 |
| 3,261,210 | 7/1966 | Buchhold | 310/90.5 |
| 4,242,608 | 12/1980 | Ishigaki | 310/68 B |
| 4,406,958 | 9/1983 | Palmero | 310/156 |
| 4,698,535 | 10/1987 | Shiraki | 310/156 |
| 4,737,675 | 4/1988 | Maemine | 310/268 |
| 4,794,293 | 12/1988 | Fujisaki | 310/268 |
| 4,797,386 | 1/1989 | Gyorgy et al. | 335/216 |

FOREIGN PATENT DOCUMENTS

| | | | |
|---|---|---|---|
| 1283946 | 11/1968 | Fed. Rep. of Germany | 310/90.5 |
| 2139506 | 2/1973 | Fed. Rep. of Germany | 310/90.5 |
| 2513424 | 2/1975 | Fed. Rep. of Germany | 310/90.5 |

OTHER PUBLICATIONS

"Superconductor World Report"; vol. 1/No. 1; 12/1987.
"Temperature Dependence of Anomalous Magnetism of Hight14 TC Superconductors"; Journal of Applied Physics; 5-1987.
"Advanced Ceramic Materials"; Amer. Ceramic Soc. Publ. vol. 2/No. 3DB; 07/87.
New materials for permanent magnets on a base of Nd and Fe, by M. Sayawa, J. Appl. Phys. 55(6), Mar. 1984.
Permanent magnet properties of rapidly quenched rare earth-iron alloys, by J. J. Croat, IEEE Trans. on mag's vol. MAG18, No. 6, Nov. '82.
Sony Specification, U-IE Brushless D.C. motor, Feb. 1988.
Principles of superconductive devices and circuits, T. Van Duger, et al, Elsevier, New York, Amsterdam, London, 1981.
DC motors, speed controls servo systems; Expanded 3rd Ed.; Electrocraft Corp., 1980.
Electric machinery, A. E. Fitzgerald et al., McGraw-Hill, New York, etc., 1983.

Primary Examiner—R. Skudy
Attorney, Agent, or Firm—Stephen C. Kaufman

[57] ABSTRACT

An electric machine that includes a superconductor bearing to position and levitate a magnetic rotor. The machine also includes an armature circuit that is electro-magnetically coupled to the rotor, and an associated drive electronics. The machine can function as a generator, or a motor to drive a load, and has an advantage of frictionless operation.

29 Claims, 6 Drawing Sheets

PROCESS FLOWCHART FOR OXIDE SUPERCONDUCTOR
POWDER PREPARATION COPRECIPITATED PRECURSOR

ELECTRIC MACHINERY EMPLOYING A SUPERCONDUCTOR ELEMENT

CROSS-REFERENCE TO A RELATED APPLICATION

This application is related to a copending and commonly assigned patent application Ser. No. 07/251,626 filed Sept. 30, 1988 to Agarwala, which is being filed contemporaneously with this application. The entire disclosure of this copending application is incorporated by reference herein.

BACKGROUND OF THE INVENTION

1. Field Of The Invention

This invention relates to electric machinery employing a superconductor element.

2. Introduction To The Invention

Electric machinery uses the principles of electro-mechanical energy conversion to convert energy from mechanical to electrical form, or the reverse. The energy conversion can be realized as translational or rotational motion or both. By way of example only, the following discussion will primarily treat rotational motion generated by a rotating machine, and it is to be understood that the translational motion case can be readily derived from the rotational motion case.

Rotating machines are well known and include synchronous machines, induction machines and D-C machines. Rotating machines may be used as a generator or a motor under the appropriate conditions. The basic principles that explain the operation of these machines are essentially the same: voltages may be generated by a relative motion of a magnetic field with respect to a winding, and torques may be produced by an interaction of the magnetic fields of a stator and a rotor winding. For a general survey and instruction on these principles, reference may be made, for example, to "Electric Machinery" by Fitzgerald et al., published in 1971 by McGraw-Hill, Inc.

SUMMARY OF THE INVENTION

Although the basic principles have remained invariant since the first rotating machines were designed in the last century, dramatic changes in materials and the state of technology have been exploited to design more powerful and efficient rotating machines.

For example, it is traditionally the case that DC machines employ current-carrying conductors called an armature, and located on a rotor; a field winding circuit located on a stator for developing a magnetic field to provide a means for electro-mechanical energy conversion; and some type of mechanical sliding contact arrangement for introducing current to the moving conductors, usually carbon brushes and commutator. However, this last component, the mechanical sliding contact arrangement, can impede the operation of the DC machine. This is true because a limiting factor on the successful operation of the DC machine may be the ability to transfer the necessary armature current through the brush contact at the commutator, without sparking and without excessive local losses and heating of the brushes and commutator.

An important response to this problem has been the relatively recent development of a brushless DC machine, in particular, the brushless DC motor. Here, the advent of electronic semiconductor devices has been exploited, so that the mechanical sliding contact arrangement may be replaced by electronic semiconductor sensing and switching devices. In accordance with this change, moreover, the brushless DC machine typically locates the armature winding on the stator. Reference may be made, for example, to "DC Motor-Speed Controls-Servo Systems, An Engineering Handbook" by Electro-Craft Corporation, Hopkins, Minn., published in 1980.

This discussion on advances in DC machines is only illustrative, and it is noted that important recent advances have been realized as well in AC synchronous machines and in induction machines.

I have now discovered a new way of utilizing superconducting materials and magnets to construct a novel electric machine. The machine of the present invention may be employed, under the appropriate conditions, as an AC synchronous motor or generator, a DC brushless motor or generator, or an induction motor or generator.

The machine comprises:

(a) a superconductor bearing;

(b) a magnetic rotor that can be positioned so that it can levitate and move with respect to the bearing and producing a first magnetic field; and (c) a stator comprising an armature winding that is connectible to a source/sink of electrical power to produce a second magnetic field between the stator and the rotor, the first and second magnetic fields capable of interacting so as to create an electromagnetic torque, so that when the machine is acting as a generator, the electromagnetic torque opposes rotation of the magnetic rotor, and when the machine is acting as a motor, the electromagnetic torque acts in the direction of rotation.

The machine as defined has many uses and provides exceptional advantages over the known electric machines. This is true for the following reasons. The invention exploits the Meissner effect: that is, there is an induced repulsive force field or expulsion field developed between the superconductor bearing and the magnetic rotor. This, in turn, in conjunction with magnetic field variations developed between the elements of the machine as defined, can be used to provide extremely stable levitation of the magnetic rotor with respect to the superconductor bearing, even at very high rotational speeds of the rotor, for example, rotational speeds of at least 300,000 rpm. Moreover, the magnetic field developed between the superconductor bearing and the magnetic rotor helps provide a machine that is essentially frictionless, i.e., a coefficient of friction developed in the interface defined by the superconductor bearing and the magnetic rotor is approximately zero.

As summarized above, the magnetic rotor may be positioned so that it can levitate and move with respect to the superconductor bearing (or vice versa). The movement can be translational or rotational or both.

Preferred embodiments of the magnetic rotor include using a magnetic rotor with an appropriately patterned magnetic pole configuration. For example, in one aspect of the invention, the magnetic rotor preferably comprises an n pole-pair configuration, where n is at least two. Preferably, the magnetic rotor is in the form of a "pie-shaped" disc, so that n pie wedges can be defined having an alternate north-south magnetization. Again, for example, the magnetic rotor may be in the form of a rectangle, with alternate columns in the rectangular magnetic rotor being dedicated to north-south magnetizations. In another example, the magnetic rotor may be in the form of a ring having concentric and alternate north-south magnetizations.

In operation, the machine, by way of the magnetic rotor, can impart movement to a load. The movement of the rotor-load may be understood by an application of force equations or torque equations. For example, the machine, viewed as a mechanical rotational system, may be referenced in the following way:

(1) Rotor/load mass (moment of Inertia J).
(2) Applied Torque To Rotor/Load (T), induced by varying magnetic field;
(3) Elastance or stiffness K of the Rotor/Load Mass, which can provide a restoring force (analogous to a spring) to the Applied Torque.

In general, the stiffness K of the machine is experienced in the movement of the magnetic rotor levitating on the superconductor bearing. The stiffness K may be determined by the material and microstructural properties of the superconductor bearing, as well as the magnetic pole pattern imparted to the magnetic rotor. In particular, it has been theorized that the stiffness is associated with the fact that the superconductor bearing does not simply repel the magnetic rotor (the Meissner Effect), but actually pins the magnetic field lines developed in the superconductor owing to a partial penetration of the magnetic flux, so as to "cradle" the magnetic rotor to the superconductor bearing. This cradling action, in turn, corresponds to the stiffness of the machine.

BRIEF DESCRIPTION OF THE DRAWINGS

The invention is illustrated in the accompanying drawings in which.

DETAILED DESCRIPTION OF THE INVENTION

Figure 1:
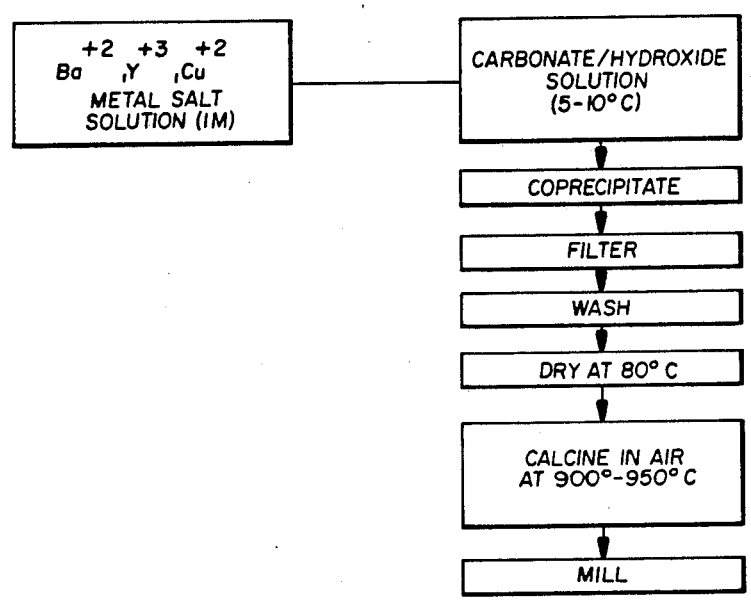
FIG. 1 shows a process flowchart for preparation of a superconductor bearing.

I now turn to preferred aspects of the machine of the present invention.

THE SUPERCONDUCTOR BEARING

The superconductor bearing may comprise a type I material or a type II material. The type I material can make a direct magnetic transition from the superconducting Meissner state to a normal state, denoted by a critical phase transition magnetization field $H_c$. The type I superconductor is able to completely expel an applied magnetic field H from its interior, as long as H is smaller than the critical field $H_c$. (This property is the Meissner effect). For $H > H_c$, on the other hand, the type I superconductor loses all of its superconducting properties. Accordingly, the invention usefully maintains the type I superconductor bearing below the critical field $H_c$. Type I superconductors are characterized as soft (in contrast to the hard type II superconductors), and include all elemental superconductors except vanadium and niobium.

Type II superconductors, in contrast to the type I superconductors, do not make a direct transition from the normal to the superconducting state. A type II superconductor exhibits the complete Meissner effect only below a lower critical magnetization field $H_{c1}$. Between $H_{c1}$ and a higher critical magnetization field $H_{c2}$ (that is, $H_{c1} < H < H_{c2}$), the type II superconductor defines a mixed state. The mixed state is an example of an inhomogeneous superconducting phase, and an external magnetic filed can penetrate into the bulk of the superconductor. Finally, beyond $H_{c2}$, the type II superconductor no longer exhibits the characteristic superconductivity properties.

As indicated above, type II hard superconductors may be contrasted to the type I soft superconductors. Type II superconductors include superconducting compounds and alloys, for example, a superconducting ceramic comprising a 1-2-3-Y-BaCu oxide. The superconductor transition temperature of this material is in the vicinity of 90 K, and has an upper critical magnetization field $H_{c2} >> 100$ K Oe.

For both type I and type II superconductors, the critical magnetization field ($H_c$ for type I, and $H_{c1}$ for type II) for levitation applications is rather low, typically less than several hundred Oersteds. Accordingly, in the present invention, the superconductor bearing preferably comprises a type II superconductor, since $H_{c2}$ can be much higher than $H_{c1}$. Moreover, the type II superconductors are preferred because the magnetic flux penetration and pinning within these superconductors are thought to give rise to a lateral stability in the levitation phenomena, and these capabilities may be absent in the type I superconductor. For both type I and type II superconductors, magnetic flux penetration and pinning may be improved by the selective employment of impurities e.g., the addition of silver or silver oxide impurity compositions to type II superconductors comprising Y-Ba-Cu oxides. Further, the magnetic flux penetration and pinning may be improved by structural and physical techniques e.g., micro-grooving and physically patterning the superconductor in a global or local context. Further details on superconductors, in general, are disclosed in the text by Duzer and Turner, Principles of Superconductive Devices and Circuits, Elsevier, N.Y., 1981, chapters 6 and 8; and the text by Ashcroft and Mermein, Solid State Physics, Holt-Saunders, N.Y., 1976.

As just disclosed, the superconductor bearing preferably comprises a type II superconductor. A preferred type II superconductor bearing is a Y-Ba-Cu oxide, known as the "1-2-3"phase. This composition is preferred because it has a high superconducting transition temperature $T_c$; it exhibits a strong anisotropy of the magnetic and electrical properties; it has a large upper critical field, $H_{c2}$; and it exhibits a substantial Meissner effect and flux pinning in both single crystals and sintered ceramics. The 1-2-3 Y-Ba-Cu oxide is an extreme type II superconductor, and it has a superconducting transition temperature of approximately 90–95 K. This high transition temperature has the advantage that a required cryogenic cooling is readily achieved with liquid nitrogen.

It is noted that, while the preferred superconductor bearing is a Y-Ba-Cu oxide, recent work in a Bi-Sr-Ca-Cu oxide system and a Tl-Ba-Ca-Cu oxide system, suggests that these systems may be advantageously employed in the near future. The latter systems realize higher temperature superconducting phases; nevertheless, present uncertainties as to their reproducibility and isolation, for example, suggests the preferred employment of the "traditional" 1-2-3 Y-Ba-Cu oxide.

A preferred process that may be used to prepare 1-2-3 Y-Ba-Cu oxide (as well as the Bi or Tl containing Cu oxides) superconductor powders is now disclosed. Attention is also directed to the flowchart shown in FIG. 1. Accordingly, an aqueous solution containing the Y, Ba, and Cu cations in the required stoichiometric ratio (1:2:3) with a total metal ion concentration of approximately 1 M is prepared. Typically, either the metal chloride or nitrate salts or a mixture is used. The room temperature metal salt solution (pH 2-3) is rapidly added to a vigorously stirred, buffered, cold (5-10° C.) caustic solution (pH 12-13) containing sodium or potassium hydroxide and carbonate in amounts adequate to cause complete precipitation of the metal ions and to maintain the pH 10-11 after the addition is completed. The precipitate is collected by either filtration or centrifugation shortly thereafter, and is thoroughly washed with distilled water to remove residual sodium/potassium and chloride/nitrate ions. Because of the partial solubility of barium hydroxide/carbonate at neutral pH, the pH of the filtrate is monitored, and washing discontinued at pH 10. The washed coprecipitate is dried at 80° C. in air, mechanically ground to a fine powder, and calcined in a stream of dry air or oxygen for six hours at 900°-950° C. The resulting black, friable solid is reground to a black moisture sensitive powder. The powder is cold-pressed (10,000 psig) into pellets which are sintered at 950°-1000° C. in oxygen for 2-12 hr, annealed at 400°-500° C. in oxygen for 6-12 hr, and then slowly cooled to room temperature in oxygen. Samples prepared by this process are all single phase and typically exhibit a temperature (onset) of 90-95K as determined by AC and DC magnetic susceptibility.

Fully dense ceramic superconductor pieces are preferred to obtain the maximum Meissner effect levitation forces. In order to achieve densities greater than the 60-80% of theoretical obtained by firing cold pressed samples as above, hot-pressing techniques preferably are employed. Densities of over 90% can be achieved for 1-2-3 Y-Ba-Cu oxide superconducting ceramics by hot pressing following by annealing in oxygen. It is possible to further increase the density to greater than 99% of theoretical by hot isostatic pressing (HIP). It is also possible to enhance orientation of the ceramic grains during the densification processing. Typically, prolonged oxygen annealing times are required to replace the oxygen lost during HIP.

THE MAGNETIC ROTOR

Continuing, and as summarized above, the machine of the present invention comprises a magnetic rotor that can be positioned so that it can levitate and move with respect to the superconductor bearing. The magnetic rotor may comprise any permanent magnet material, or an electromagnet. Preferably, the magnetic rotor comprises a permanent magnet, in particular, a rare earth and transition metal based "supermagnet", although conventional ferrites or alnico magnets can be used.

The preferred rare earth permanent magnetic rotor has a high coercivity or high energy product of at least 5 MG Oe. Such a magnet can be provided by way of a sintering or melt-spinning process. Preferred magnets comprising a Sm-Co composition can be manufactured by the sintering process, for example, while magnets comprising a Nd-Fe-B alloy can be manufactured by sintering or by melt-spinning process. Further details on these processes are provided by M. Sagawa et al., J. Appl. Phys., 55, p.2083 (1984) and J. J. Croat, IEEE Trans. Magn. MAG-1, p.1442 (1982). The disclosure of each of these references is incorporated by reference herein.

The permanent magnet is magnetized in a desired magnetic-pole configuration in accordance with a particular application design. For example, the magnetization of a single continuous magnetic rotor may be isotropic or anisotropic, and have a multi-faceted, multi-pole pattern, as disclosed above.

In a preferred embodiment, the magnetic rotor comprises a three-part structure, namely: (a) a first magnetic element comprising at least two pole-pairs, and electromagnetically coupled to the armature winding; (b) a buffer magnet which physically contacts and is magnetically coupled to the first magnetic element; and (c) a second magnetic element which (1) physically contacts the buffer magnet, (2) is isolated from the first magnetic element by the buffer magnet, and (3) is magnetically coupled to the superconductor bearing.

The second magnetic element preferably provides a rotationally symmetrical magnetic field configuration for the case where the rotor predominantly rotates with respect to the stator. Alternatively, the second magnetic element preferably provides a translationally symmetrical magnetic field configuration for the case where the rotor predominantly translates with respect to the stator. When a discrete or discontinuous translational or rotational movement of the rotor is desired, the second magnetic element preferably comprises at least two pole-pairs. This design can accommodate such discrete movements in a step-wise fashion.

The magnetic rotor comprising the three-part structure is preferred for the following reasons. It is theorized that this structure minimizes any magnetic interference of one magnet with the other. At the same time, the structure maximizes the electro-magnetic coupling of the first magnetic element to the armature winding, and independently, maximizes the magnetic coupling of the second magnetic element to the superconductor bearing, thus enhancing the lateral stability and the desired rotational/translational freedom of the rotor levitating above the superconductor bearing.

THE STATOR

Figure 2:
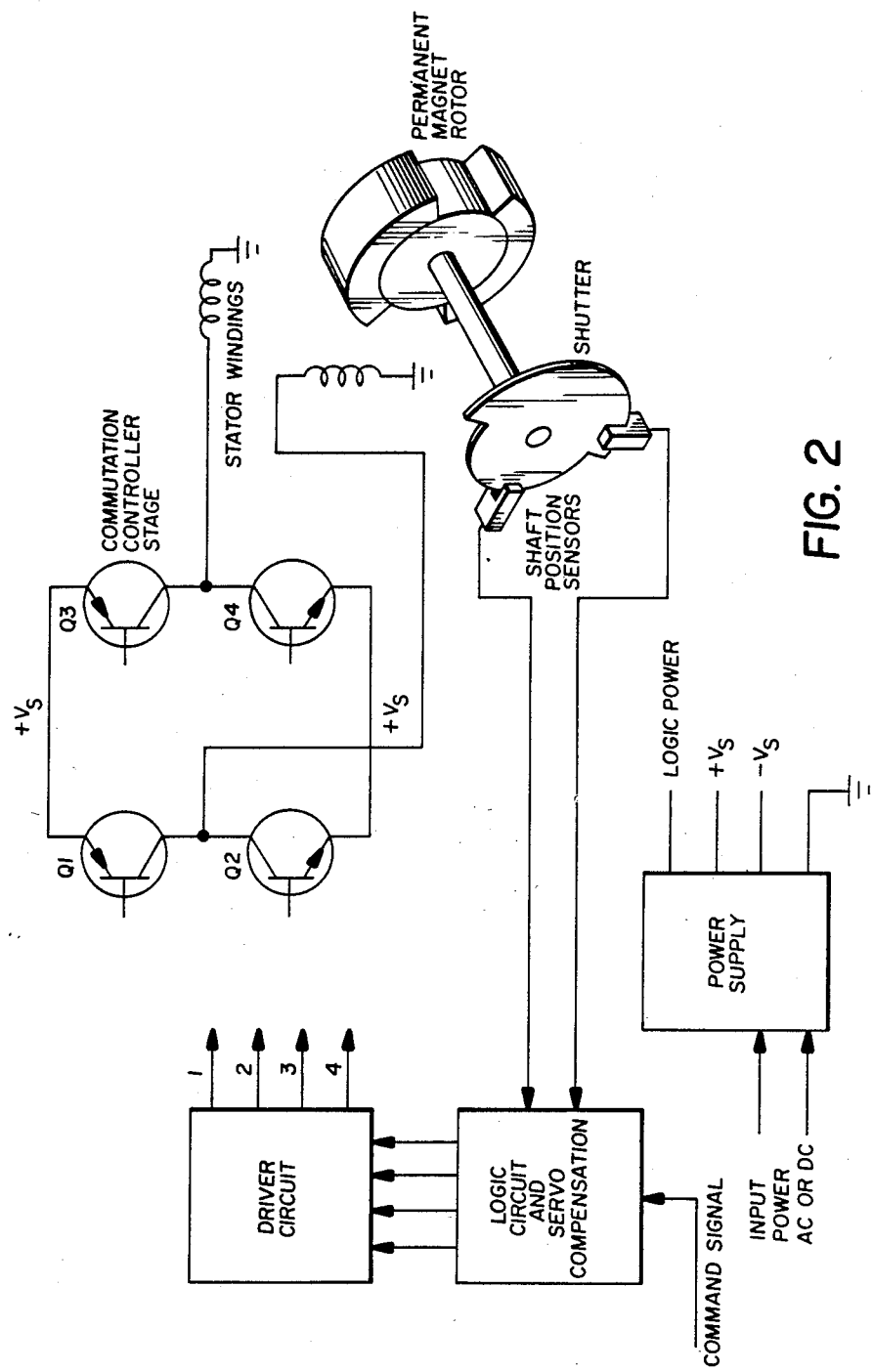
FIG. 2 shows the essential parts of a brushless DC motor control.

As summarized above, the machine of the present invention comprises the stator, which stator comprises an armature winding that is connectible to a source of electrical power to produce the second magnetic field. Preferred drive electronics which control the commutation of the windings are shown in FIG. 2. In particular, FIG. 2 includes a permanent magnet rotor. In other embodiments, not shown, the magnetic rotor may be an electromagnet. FIG. 2 also shows a plurality of rotor position sensors, which preferably comprise a Hall-effect sensing system, although an electro-optical switch system or a radio frequency sensing system may be used. The rotor position sensors provide inputs, in a well known way, to a logic circuit, to generate logic signals which may be used to control the commutation of the windings. Thus, the logic signals are acted upon by a driver circuit and a commutation controller stage, comprising a transistor Q circuit, to appropriately change the polarity of a power supply signal as it is inputted to the stator windings. In effect, torque reversal is achieved, not by reversing the power supply voltage, as in the traditional motor, but instead by shifting the logic functions 180°el.

EXAMPLE

A DC brushless machine in accordance with the principles of the present invention was made in the following way.

SUPERCONDUCTOR BEARING

Figure 3A:
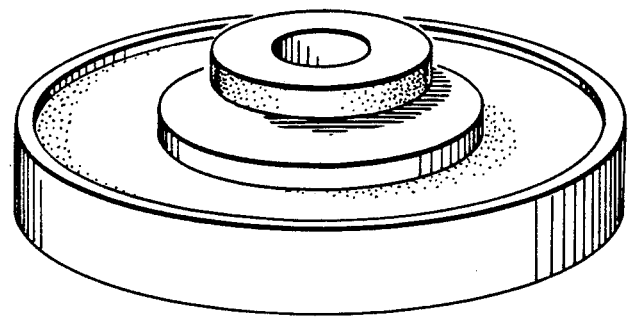
FIGS. 3A–C show components of a machine constructed in accordance with the principles of the present invention.

A superconductor bearing, shown in FIG. 3A, was prepared in accordance with the disclosure above. The superconductor bearing comprised a high temperature type II superconducting ceramic material $Y Ba_2 Cu_3 O_7$. The superconductor transition temperature was in the vicinity of 90K, so that it could maintain its superconductivity in liquid nitrogen (boiling point 77K). The superconductor bearing had a critical magnetization field $H_{c2} >> 100$ K Oe. The superconductor bearing was in the form of a disk of diameter roughly 29 mm and thickness 4.5 mm. It had a slight curvature, amounting to a depth of roughly 0.7 mm in the center. It was theorized that such a curved shape enhanced the lateral stability of a magnetic rotor, levitating above it and facing its concave surface.

MAGNETIC ROTOR

Figure 3B:
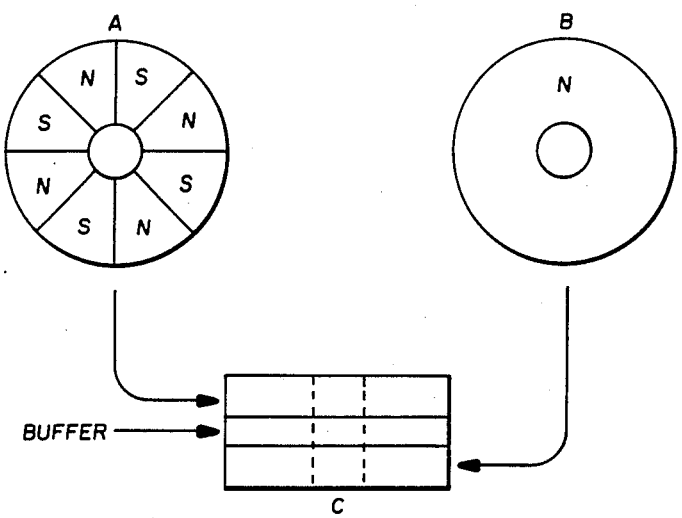

A magnetic rotor comprising a three-part structure was prepared. It is shown in FIG. 3B.

The first part of the rotor was an eight pole-pair ring shaped permanent magnet. The magnet comprised a plastic bonded Nd-Fe-B alloy, and had an annular disk shape with outer diameter 20.5 mm, inner diameter 8.7 mm, and thickness 1.27 mm. The magnet was magnetized to give rise to eight pole-pairs with alternating pole sectors subtending an angle of approximately 45° at the center.

The second part of the rotor comprised three buffer layers, each layer comprising a mild steel, high permeability, high saturation magnetization material. Each buffer layer was in the form of a disk, having a diameter of 21 mm, and thickness 0.10 mm.

The third part of the rotor comprised a magnet having a North-pole on one planar surface, and a South-pole on an opposite planar surface. This magnet comprised a plastic bonded Nd-Fe-B alloy, like the eight pole-pair magnet, and had similar dimensions.

The magnetic rotor comprising this three part structure, was held intact by mutual magnetic forces.

STATOR COMPRISING AN ARMATURE WINDING

Figure 3C:
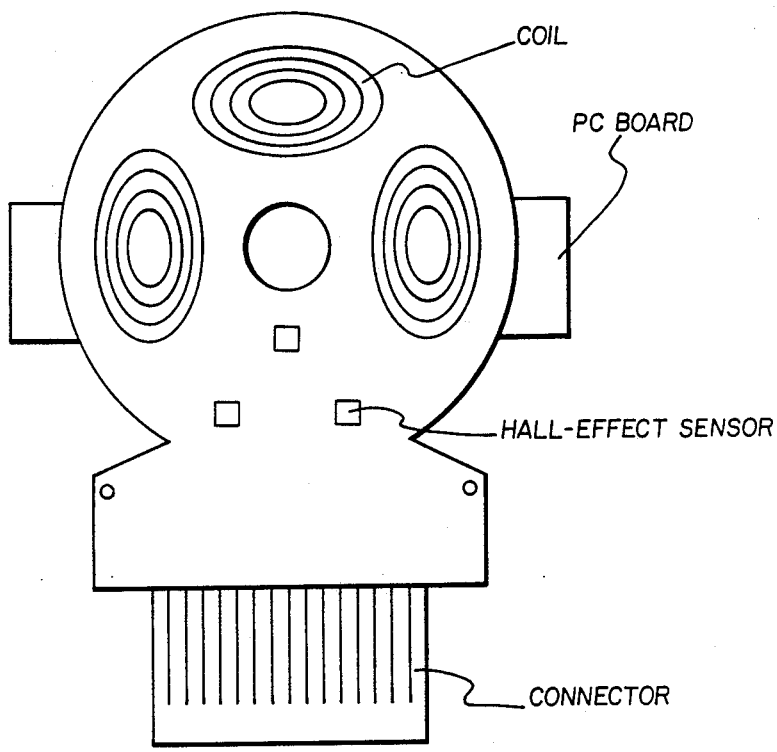

The stator, shown in FIG. 3C (prior art), comprised an armature winding of the type available from a model number U-1E from Sony Corp., Japan. The main part of this component was a set of three copper coils mounted on a printed circuit board (PCB). The PCB also included three Hall-effect sensors, to sense the polarity of the second magnetic field, and thereby regulate and switch the current, by way of a conventional H-bridge transistor switch, fed to the copper coils. The armature winding was connected to an external 9 V battery.

THE MACHINE

Figure 4:
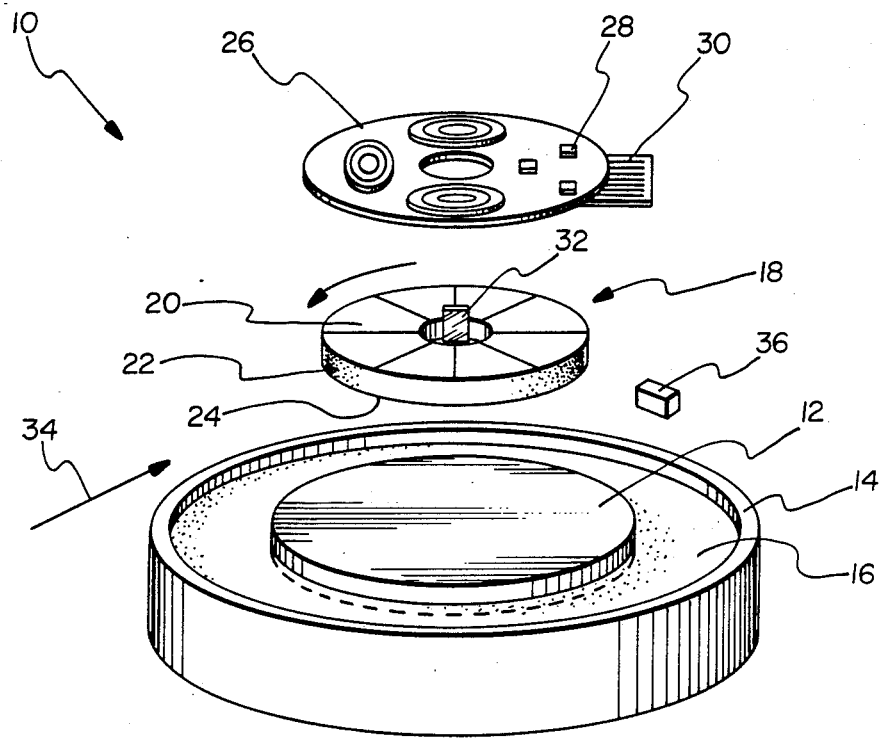
FIG. 4 shows a machine of the invention.

A DC brushless machine 10 was assembled in accordance with the Example. It is shown in FIG. 4. It included a superconductor bearing 12 comprising $Y Ba_2 Cu_3 O_7$, and it was submerged in a quartz petri dish 14 containing liquid nitrogen 16. A magnetic rotor 18 levitated above the bearing 12. The rotor 18 comprised an eight pole-pair permanent magnet 20, a buffer magnet 22, and a bipolar magnet 24 that faced the bearing 12. The magnet 20, on the other hand, faced a brushless armature 26 and 3 Hall-effect sensors 28. A drive electronics 30 was electrically connected to the armature 26, and included a 9 V battery circuit, and a conventional H-Bridge transistor switch (not shown). A single facet mirror 32 was attached to the rotor 18 to demonstrate the use of the machine 10 to deflect, at a rotational speed of 15,000 rpm, a laser beam 34 in a laser scanner. This action, at a photocell 36 location, produced a clear scanned line, without diffusion or jitter.

The DC brushless machine of the Example was modified to demonstrate its employment as a brushless AC synchronous machine, and as an induction machine. In the first case, the armature winding was connected to an AC power source, the Hall-effect sensors were removed, and the machine functioned as a brushless AC synchronous motor. In the second case, the armature winding was again connected to an AC power source, eddy currents developed in the magnetic rotor, and the machine functioned as an induction motor.

What is claimed is:

1. A machine comprising:
   (a) a superconductor bearing;
   (b) a magnetic rotor that can be positioned so that it can levitate and move with respect to the superconductor bearing and producing a first magnetic field; and
   (c) a stator comprising an armature winding that is connectible to a source/sink of electrical power to produce a second magnetic field between the stator and the rotor, the first and second magnetic fields capable of interacting so as to create an electromagnetic torque, so that
   when the machine is acting as a generator, the electromagnetic torque opposes rotation of the rotor, and
   when the machine is acting as a motor, the electromagnetic torque acts in the direction of rotation.

2. A machine as set forth in claim 1, wherein the superconductor bearing comprises a type I material.

3. A machine as set forth in claim 1, wherein the superconductor bearing comprises a type II material.

4. A machine as set forth in claim 1, wherein the superconductor bearing comprises a ceramic material.

5. A machine as set forth in claim 4, wherein the ceramic material is a composition comprising a 1-2-3-Y-Ba-Cu Oxide.

6. A machine as set forth in claim 1, wherein the superconductor bearing has a transition temperature of at least 4° K.

7. A machine as set forth in claim 1, wherein the superconductor bearing is in the form of a disc.

8. A machine as set forth in claim 7, wherein the disc has a curved shape for enhancing the levitation stability of the magnetic rotor with respect to the disc.

9. A machine as set forth in claim 1, wherein the magnetic rotor comprises a ferrite composition.

10. A machine as set forth in claim 1, wherein the magnetic rotor is an electromagnet.

11. A machine as set forth in claim 1, wherein the magnetic rotor is a high energy-product permanent magnet.

12. A machine as set forth in claim 1, wherein the magnetic rotor has an energy product of at least 1 MG Oe.

13. A machine as set forth in claim 1, wherein the magnetization of the magnetic rotor lies along its thickness.

14. A machine as set forth in claim 1, wherein the magnetic rotor comprises a sintered anisotropic Nd-Fe-B composition.

15. A machine as set forth in claim 1, wherein the magnetic rotor comprises a SM-Co composition.

16. A machine as set forth in claim 1, wherein the anisotropy direction is along the thickness of a sample along which it is magnetized.

17. A machine as set forth in claim 1, wherein the magnetic rotor is an n pole-pair magnet, and n is at least two.

18. A machine as set forth in claim 1, wherein the magnetic rotor is in the shape of a flat donut.

19. A machine as set forth in claim 1, wherein the magnetic field developed between the superconductor bearing and the magnetic rotor is non-symmetrical.

20. A machine as set forth in claim 1, wherein the magnetic rotor rotates with respect to the superconductor bearing.

21. A machine as set forth in claim 1, wherein the magnetic rotor translates with respect to the superconductor bearing.

22. A machine as set forth in claim 1, wherein the magnetic rotor comprises:
   (a) a first magnetic element comprising at least two pole-pairs, and electro-magnetically coupled to the armature winding;
   (b) a buffer magnet which physically contacts and is magnetically coupled to the first magnetic element; and
   (c) a second magnetic element, which (1) physically contacts the buffer magnet, (2) is isolated from the first magnetic element by the buffer magnet, and (3) is magnetically coupled to the superconductor bearing.

23. A machine as set forth in claim 22, wherein the first magnetic element is an 8 pole-pair.

24. A machine as set forth in claim 22, wherein the buffer magnet comprises a layer of high permeability and high saturation material.

25. A machine as set forth in claim 22, wherein the first and second magnetic elements comprise a plastic bonded Nd-Fe-B alloy.

26. A machine as set forth in claim 1, wherein the armature winding is electrically connected to a circuit comprising:
   (a) at least one sensor, for sensing the polarity of the second magnetic field; and
   (b) an electrical switch, which in response to the or each sensor, coordinates the input of electrical power from a DC source to the armature winding to change the polarity of the second magnetic field.

27. A machine as set forth in claim 26, wherein each sensor comprises a Hall-effect capability.

28. A machine as set forth in claim 1, wherein the armature winding is connected to an AC power source so that the machine operates as a brushless AC synchronous motor.

29. A machine as set forth in claim 1, wherein the armature winding is connected to an AC power source so that eddy currents are induced in the magnetic rotor and the machine operates as an induction motor.

* * * * *